(12) United States Patent
Doi

(10) Patent No.: US 9,556,585 B2
(45) Date of Patent: Jan. 31, 2017

(54) HYDRAULIC EXCAVATOR

(71) Applicant: KOMATSU LTD., Tokyo (JP)

(72) Inventor: Yuichi Doi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 275 days.

(21) Appl. No.: 14/399,332

(22) PCT Filed: Aug. 8, 2014

(86) PCT No.: PCT/JP2014/071030
§ 371 (c)(1),
(2) Date: Nov. 6, 2014

(87) PCT Pub. No.: WO2015/059983
PCT Pub. Date: Apr. 30, 2015

(65) Prior Publication Data
US 2016/0273190 A1 Sep. 22, 2016

(51) Int. Cl.
*B60K 13/04* (2006.01)
*E02F 9/08* (2006.01)
*E02F 9/18* (2006.01)
*E02F 3/32* (2006.01)
*F01N 3/20* (2006.01)
(Continued)

(52) U.S. Cl.
CPC .............. *E02F 9/0866* (2013.01); *E02F 3/32* (2013.01); *E02F 9/0808* (2013.01); *E02F 9/18* (2013.01); *F01N 3/103* (2013.01); *F01N 3/2066* (2013.01); *F01N 13/009* (2014.06); *F01N 2340/04* (2013.01); *F01N 2590/08* (2013.01); *F01N 2610/1426* (2013.01); *F01N 2610/1453* (2013.01)

(58) Field of Classification Search
CPC .............. E02F 9/08; E02F 3/22; E02F 9/0808; E02F 9/22; E02F 9/0833; E02F 9/0866; B60K 15/063; B60K 13/04
See application file for complete search history.

(56) References Cited

U.S. PATENT DOCUMENTS 8,403,099 B2 * 3/2013 Yokota ................. B60K 15/063
180/309
8,899,017 B2 * 12/2014 Himoto ................. F01N 3/2066
60/282

(Continued)

FOREIGN PATENT DOCUMENTS

CN 201756714 U 3/2011
JP S62-116091 U 7/1987
(Continued)

*Primary Examiner* — Hau Phan
(74) *Attorney, Agent, or Firm* — Drinker Biddle & Reath LLP

(57) ABSTRACT

A hydraulic excavator capable of achieving prevention of interference between an exhaust gas treatment device and a counterweight and suppression of lowering in operability at the time of lifting of a counterweight is provided. An auxiliary plate is provided to be attachable to and detachable from a counterweight. The auxiliary plate is superimposed on the exhaust gas treatment device in a plan view while it is attached to the counterweight. The counterweight has a plurality of holes for lifting formed in an upper surface. The hole for lifting is formed in the auxiliary plate.

10 Claims, 13 Drawing Sheets

(51) Int. Cl.
*F01N 13/00* (2010.01)
*F01N 3/10* (2006.01)

(56) References Cited

U.S. PATENT DOCUMENTS

| | | | | |
|---|---|---|---|---|
| 8,919,486 | B2* | 12/2014 | Nakagami | E02F 9/0866 180/309 |
| 9,010,095 | B2* | 4/2015 | Himoto | E02F 9/0833 180/296 |
| 9,016,426 | B2* | 4/2015 | Himoto | E02F 9/0833 180/296 |
| 9,033,095 | B2* | 5/2015 | Sakai | F01N 13/1805 180/309 |
| 2010/0187383 | A1* | 7/2010 | Olsen | F01N 13/1805 248/201 |
| 2010/0192551 | A1* | 8/2010 | Yokota | B60K 15/063 60/295 |
| 2012/0247861 | A1* | 10/2012 | Mizuno | B60K 13/04 180/296 |
| 2013/0319787 | A1* | 12/2013 | Kobayashi | E02F 9/0866 180/309 |
| 2013/0343853 | A1* | 12/2013 | Sato | E02F 9/0866 414/719 |

FOREIGN PATENT DOCUMENTS

| | | |
|---|---|---|
| JP | 2008-156835 A | 7/2008 |
| JP | 2008-240695 A | 10/2008 |
| JP | 2010-247553 A | 11/2010 |
| JP | 2011-157721 A | 8/2011 |
| JP | 2012-117249 A | 6/2012 |

\* cited by examiner

HYDRAULIC EXCAVATOR

TECHNICAL FIELD

The present invention relates to a hydraulic excavator.

BACKGROUND ART

An exhaust gas treatment device is mounted on a hydraulic excavator. As the exhaust gas treatment device, for example, a diesel particulate filter device (DPF), a diesel oxidation catalyst device (DOC), a selective catalytic reduction device (SCR), and the like are available.

Japanese Patent Laying-Open No. 2012-117249 (PTD 1) discloses such a structure that a recess cut in a recessed shape is formed in a counterweight and an exhaust gas after-treatment device is arranged in the recessed portion of the counterweight.

CITATION LIST

Patent Document

PTD 1: Japanese Patent Laying-Open No. 2012-117249

SUMMARY OF INVENTION

Technical Problem

A counterweight for holding balance of a vehicular body should be arranged on a revolving frame of a hydraulic excavator. An exhaust gas treatment device for treating an exhaust gas from an engine should be arranged in a rear portion of a vehicular body in proximity to the engine, and it is desirably arranged close to the counterweight because an area of the revolving frame is limited. In this case, when a thickness of the counterweight is decreased in order to avoid interference of the exhaust gas treatment device with the counterweight, a thickness necessary for providing a lift portion for lifting the counterweight cannot be obtained. Consequently, operability involved with an operation for lifting the counterweight could lower.

An object of the present invention is to provide a hydraulic excavator capable of achieving prevention of interference between an exhaust gas treatment device and a counterweight and suppression of lowering in operability at the time of lifting of a counterweight.

Solution to Problem

A hydraulic excavator according to the present invention includes a revolving frame, an engine, a first exhaust gas treatment device, a counterweight, and an auxiliary plate. The engine is arranged on the revolving frame. The first exhaust gas treatment device treats an exhaust gas from the engine. The counterweight is arranged on the revolving frame in the rear of the engine. The auxiliary plate is attachable to and detachable from the counterweight and superimposed on the first exhaust gas treatment device in a plan view while the auxiliary plate is attached to the counterweight. The counterweight has a plurality of lift portions in an upper surface. One of the lift portions is provided in the auxiliary plate.

According to the hydraulic excavator in the present invention, while the auxiliary plate is attached to the counterweight, the lift portion provided in the auxiliary plate can be made use of for lifting the counterweight so that lowering in operability at the time of lifting can be suppressed. By providing a lift portion in the auxiliary plate, a thickness of the counterweight can be decreased. Therefore, even when the exhaust gas treatment device is arranged further rearward, interference between the exhaust gas treatment device and the counterweight can be prevented. By detaching the auxiliary plate from the counterweight, only the exhaust gas treatment device can readily be detached from the hydraulic excavator without the need for detaching the counterweight large in weight.

In the hydraulic excavator above, the counterweight has a depression formed, which is formed as a part of an inner peripheral surface thereof is recessed toward an outer peripheral surface in a plan view. The auxiliary plate is superimposed on the depression in a plan view while the auxiliary plate is attached to the counterweight. Since the depression is formed in the counterweight, a wider path for detachment of the exhaust gas treatment device can be secured by detaching the auxiliary plate superimposed on the depression from the counterweight. Therefore, operability at the time of detachment of the exhaust gas treatment device can further be improved.

In the hydraulic excavator above, the first exhaust gas treatment device is arranged on the right in a lateral direction of the revolving frame. The lift portion has a left lift portion provided on the left in the lateral direction of the revolving frame and a central lift portion provided in a central portion in the lateral direction of the revolving frame. By doing so, since the counterweight can be lifted at three points by using three lift portions, a counterweight 5 can be lifted in a stable attitude.

The hydraulic excavator above further includes a second exhaust gas treatment device for treating the exhaust gas from the engine. The first exhaust gas treatment device and the second exhaust gas treatment device are arranged such that a longitudinal direction of each of them extends along a fore/aft direction of the revolving frame. The first exhaust gas treatment device and the second exhaust gas treatment device are arranged in an order of the second exhaust gas treatment device and the first exhaust gas treatment device from a center toward an end in a lateral direction of the revolving frame. A rear end of the first exhaust gas treatment device is arranged forward relative to a rear end of the second exhaust gas treatment device. The counterweight has, in its inner peripheral surface, such a step portion that an end side protrudes forward relative to a central side in the lateral direction of the revolving frame in a plan view.

By doing so, an exhaust gas treatment device can be arranged in proximity to the counterweight, and the exhaust gas treatment device can appropriately be arranged on the revolving frame of which area is limited. Since the inner peripheral surface of the counterweight protrudes forward on the end side relative to the step portion, decrease in weight of the counterweight can be suppressed.

In the hydraulic excavator above, the first exhaust gas treatment device is smaller in dimension in a longitudinal direction than the second exhaust gas treatment device. By thus arranging the exhaust gas treatment device, an area necessary for arranging the exhaust gas treatment device on the revolving frame can be decreased.

In the hydraulic excavator above, the step portion is closer to the center in the lateral direction of the revolving frame, toward an upward direction. By providing a step portion in such a shape, a counterweight excellent in design and strength can be provided.

In the hydraulic excavator above, the counterweight has a recess formed in the inner peripheral surface. The recess has a shape recessed relative to an upper side and a lower side of the recess. By forming a recess accepting the exhaust gas treatment device in the counterweight, the exhaust gas treatment device can be arranged further rearward. By having the upper side and the lower side protrude forward relative to the recess, a weight of the counterweight can be increased.

The hydraulic excavator above further includes a bracket supporting the first exhaust gas treatment device and the second exhaust gas treatment device. An edge portion of the bracket along the rear end of the second exhaust gas treatment device protrudes toward the counterweight relative to an edge portion of the bracket along the rear end of the first exhaust gas treatment device in a plan view. Thus, the exhaust gas treatment device mounted on the bracket can be arranged closer to the counterweight.

A method of detaching an exhaust gas treatment device according to the present invention is a method of detaching the exhaust gas treatment device from a hydraulic excavator. The hydraulic excavator includes a revolving frame, an engine arranged on the revolving frame, an exhaust gas treatment device for treating an exhaust gas from the engine, a counterweight arranged on the revolving frame in the rear of the engine, and an auxiliary plate attachable to and detachable from the counterweight, which is superimposed on the exhaust gas treatment device in a plan view while the auxiliary plate is attached to the counterweight. The counterweight has a plurality of lift portions in an upper surface. One of the lift portions is provided in the auxiliary plate. The method of detaching the exhaust gas treatment device includes the steps of detaching the auxiliary plate from the counterweight and moving the exhaust gas treatment device diagonally upward so as to avoid interference with the counterweight until the counterweight and the exhaust gas treatment device are no longer superimposed on each other in a plan view.

According to the method of detaching the exhaust gas treatment device in the present invention, the exhaust gas treatment device can be detached from the hydraulic excavator without interference between the exhaust gas treatment device and the counterweight.

Advantageous Effects of Invention

As described above, according to the present invention, interference between the exhaust gas treatment device and the counterweight can be prevented and lowering in operability at the time of lifting of the counterweight can be suppressed.

DESCRIPTION OF EMBODIMENTS

An embodiment of the present invention will be described hereinafter with reference to the drawings.

Initially, a structure of a hydraulic excavator to which the concept according to the present invention is applicable will be described.

Figure 1:
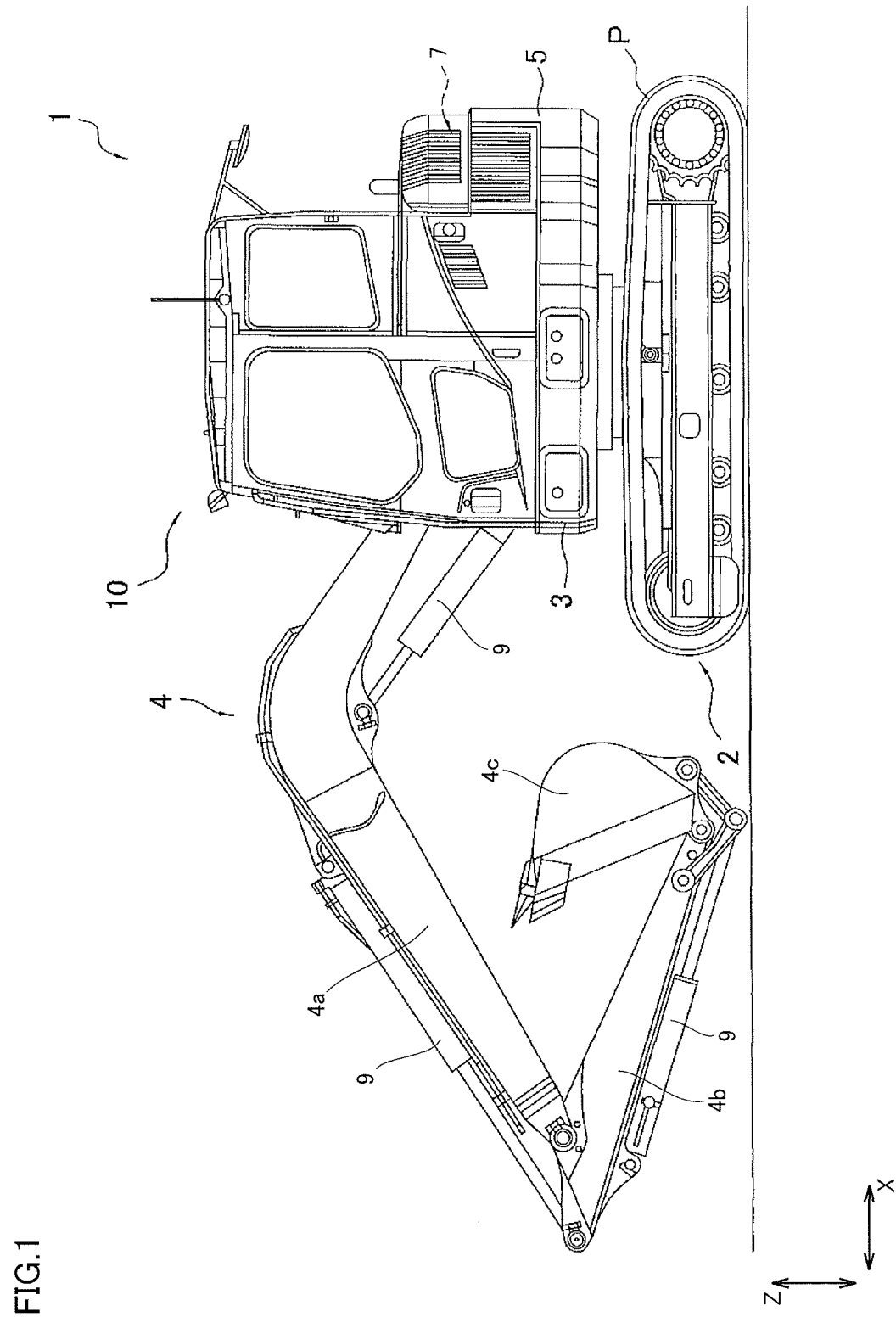
FIG. 1 is a side view showing a structure of a hydraulic excavator according to one embodiment of the present invention.

FIG. 1 is a side view showing a structure of a hydraulic excavator according to one embodiment of the present invention. Hydraulic excavator 1 according to the present embodiment mainly includes a lower carrier 2, an upper revolving unit 3, a work implement 4, a counterweight 5, an engine 7, and a cab 10, as shown in FIG. 1. Lower carrier 2 and upper revolving unit 3 mainly constitute a main body of the hydraulic excavator.

Lower carrier 2 has a pair of crawler belts P wound around left and right opposing end portions in a direction of travel. Lower carrier 2 is structured to be self-propelled as the pair of crawler belts P rotates.

Upper revolving unit 3 is set to be revolvable in any direction with respect to lower carrier 2. Upper revolving unit 3 includes, on a front left side, cab 10 which is an operator's cab which an operator of hydraulic excavator 1 gets in and out. Upper revolving unit 3 includes, on a rear side, counterweight 5 and an engine compartment for accommodating engine 7.

In the present embodiment, a forward side (a front side) of a driver while the driver is seated in cab 10 is defined as the forward side of upper revolving unit 3, a rear side of the driver is defined as the rear side of upper revolving unit 3, a left side of the driver in a seated state is defined as the left side of upper revolving unit 3, and a right side of the driver in the seated state is defined as the right side of upper revolving unit 3. In the description below, fore, aft, left, and right of upper revolving unit 3 correspond to fore, aft, left, and right of hydraulic excavator 1, respectively. In the drawings below, a fore/aft direction is shown with an arrow X in the drawings, a lateral direction is shown with an arrow Y in the drawings, and a vertical direction is shown with an arrow Z in the drawings.

Work implement 4 for such work as excavation of soil is pivotally supported by upper revolving unit 3 so as to be freely operable in a vertical direction. Work implement 4 has a boom 4a attached to be operable in the vertical direction in a substantially central portion on a front side of upper revolving unit 3, an arm 4b attached to be operable in a fore/aft direction at a tip end portion of boom 4a, and a bucket 4c attached to be operable in the fore/aft direction at a tip end portion of arm 4b. Boom 4a, arm 4b, and bucket 4c are each driven by a hydraulic cylinder 9.

Work implement 4 is provided on the right of cab 10, which is one side of cab 10, such that an operator who gets on board cab 10 can view a tip end portion of work implement 4. Cab 10 is arranged lateral to a portion of attachment of work implement 4.

Counterweight 5 is a weight arranged in the rear portion of upper revolving unit 3 for keeping balance of a vehicular body during excavation or the like. Hydraulic excavator 1 is formed as a short tail swing hydraulic excavator, which is small in radius of swing of a rear surface of counterweight 5. Therefore, the rear surface of counterweight 5 is formed in an arc shape around a center of swing of upper revolving unit 3 when viewed from above. Engine 7 is accommodated in the engine compartment in the rear portion of upper revolving unit 3.

Figure 2:
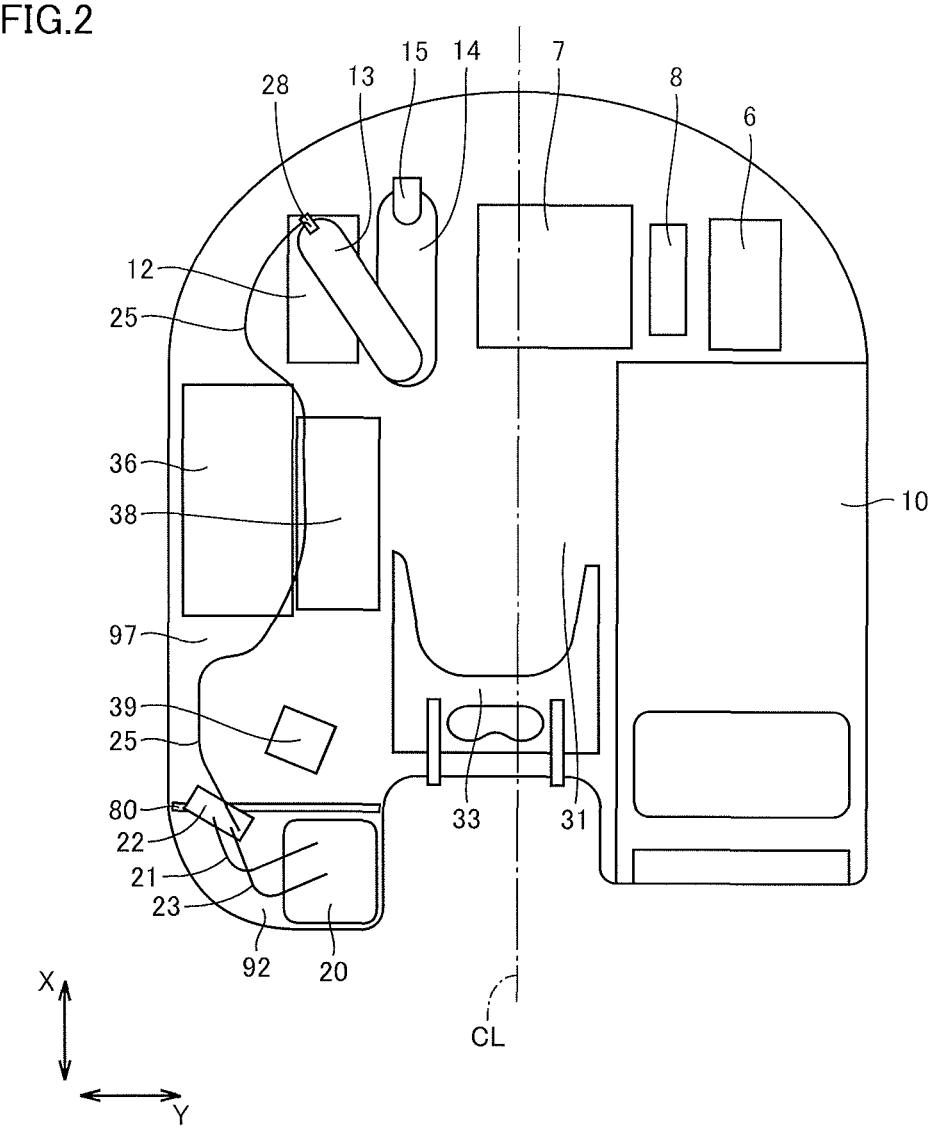
FIG. 2 is a schematic plan view showing arrangement of each device on a revolving frame.

FIG. 2 is a schematic plan view showing arrangement of each device on a revolving frame 31. A lower side in FIG. 2 shows a forward side of upper revolving unit 3 and an upper side in FIG. 2 shows a rear side of upper revolving unit 3. FIG. 2 illustrates a path of a pipe (a supply pipe 21 and a delivery pipe 25) for supplying a reducing agent from a reducing agent tank 20 to an exhaust gas treatment unit over revolving frame 31 in hydraulic excavator 1 shown in FIG. 1. A chain dotted line in FIG. 2 shows a centerline CL in the lateral direction of revolving frame 31.

A reducing agent and a precursor of the reducing agent are herein collectively referred to as a "reducing agent".

Engine 7 which is a motive power source for driving lower carrier 2 and work implement 4 shown in FIG. 1 is mounted on revolving frame 31. Engine 7 is mounted in a rear portion of a center frame on a central side in the lateral direction of revolving frame 31. Engine 7 large in weight is arranged at a rear end of the main body of the hydraulic excavator, which is distant from a center bracket 33 supporting work implement 4 and is close to counterweight 5, in consideration of weight balance with work implement 4 attached in the front of the main body of the hydraulic excavator. The engine compartment accommodating engine 7 is provided in the rear portion of upper revolving unit 3.

The engine compartment accommodates a cooling unit 6 and a fan 8. In the engine compartment, cooling unit 6, fan 8, and engine 7 are disposed in this order from left to right. Fan 8 is rotationally driven by engine 7 so as to generate a flow of air which passes through the engine compartment. Fan 8 generates a flow of air from the left to the right of the main body of the hydraulic excavator. Cooling unit 6 is arranged on the left of fan 8, which is upstream in the flow of air generated by fan 8. Engine 7 is arranged on the right of fan 8, which is downstream in the flow of air generated by fan 8.

Cooling unit 6 includes a radiator, an intercooler, and an oil cooler. The radiator is a cooling device for cooling a coolant for engine 7. The intercooler is a cooling device for cooling compression air supplied to engine 7. The oil cooler is a cooling device for cooling a hydraulic oil supplied to various hydraulic actuators mounted on hydraulic excavator 1, such as hydraulic cylinder 9 (FIG. 1).

Hydraulic excavator 1 includes in the engine compartment, an exhaust gas treatment unit for treating and purifying an exhaust gas emitted from engine 7. The exhaust gas treatment unit mainly includes exhaust gas treatment devices 12 and 14, an intermediate connection pipe 13, an exhaust stack 15, and an injection nozzle 28 for a reducing agent. In the plan view shown in FIG. 2, the exhaust gas treatment unit is arranged on the right of engine 7. A not-shown hydraulic pump driven by engine 7 so as to transfer a hydraulic oil is directly coupled to engine 7. The hydraulic pump is arranged adjacently on the right of engine 7 and the exhaust gas treatment unit is arranged above the hydraulic pump.

Exhaust gas treatment device 12 is connected to engine 7 through an exhaust pipe 11 (FIG. 3) which will be described later. Exhaust gas treatment device 14 is connected to exhaust gas treatment device 12 through intermediate connection pipe 13. The exhaust gas emitted from engine 7 is emitted from exhaust stack 15 into atmosphere after it successively passed through exhaust gas treatment devices 12 and 14. In the flow of emission of the exhaust gas from engine 7, exhaust gas treatment device 12 is arranged downstream of engine 7 and exhaust gas treatment device 14 is arranged downstream of exhaust gas treatment device 12.

Exhaust gas treatment device 12 oxidizes an unburned gas such as carbon monoxide and hydrocarbon contained in the exhaust gas emitted from engine 7 so as to lower a concentration of the unburned gas in the exhaust gas. Exhaust gas treatment device 12 is implemented, for example, by a diesel oxidation catalyst device. Exhaust gas treatment device 14 reduces a nitrogen oxide contained in the exhaust gas through reaction with a reducing agent and chemically changes the nitrogen oxide to a harmless nitrogen gas, to thereby lower a concentration of the nitrogen oxide in the exhaust gas. Exhaust gas treatment device 14 is implemented, for example, by an NO removal device of a selective catalytic reduction type. Intermediate connection pipe 13 is provided with injection nozzle 28 for injecting a reducing agent into intermediate connection pipe 13. Intermediate connection pipe 13 has a function as a mixing pipe for injecting and mixing the reducing agent into the exhaust gas.

Exhaust gas treatment devices 12 and 14 are arranged to extend from the center frame on the central side in the lateral direction of revolving frame 31 toward a side frame on the right and arranged on the right in the lateral direction of revolving frame 31. A not-shown hydraulic pump is arranged adjacently on the right of engine 7, and exhaust gas treatment devices 12 and 14 are arranged above the hydraulic pump. Exhaust gas treatment devices 12 and 14 are arranged at a distance from revolving frame 31 and a hydraulic pump is arranged below exhaust gas treatment devices 12 and 14.

Exhaust gas treatment devices 12 and 14 are arranged such that a longitudinal direction of each of them extends along the fore/aft direction of revolving frame 31. Exhaust gas treatment devices 12 and 14 are disposed in the order of exhaust gas treatment device 14 and exhaust gas treatment device 12 from the center toward the end in the lateral direction of revolving frame 31.

Hydraulic excavator 1 includes a reducing agent supply portion for supplying a reducing agent to the exhaust gas treatment unit. The reducing agent supply portion includes reducing agent tank 20 and a reducing agent pump 22. Reducing agent tank 20 stores a reducing agent used in exhaust gas treatment device 14. For example, a urea solution is suitably employed as the reducing agent, however, the reducing agent is not limited thereto.

Reducing agent tank 20 and reducing agent pump 22 are mounted on the side frame on the right in revolving frame 31. Reducing agent pump 22 is arranged forward relative to the engine compartment. Reducing agent tank 20 is arranged forward relative to reducing agent pump 22. Reducing agent tank 20 is arranged at a distance from engine 7 which is a device at a high temperature, for prevention of deterioration of the reducing agent due to temperature increase thereof, and it is arranged, for example, at a front end of revolving frame 31.

Reducing agent tank 20 and reducing agent pump 22 are coupled to each other through supply pipe 21 and a return pipe 23. Supply pipe 21 is a pipe for sending the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to each other through delivery pipe 25. Delivery pipe 25 is a pipe for transferring the reducing agent from reducing agent pump 22 to injection nozzle 28.

The reducing agent transferred from reducing agent tank 20 through supply pipe 21 to reducing agent pump 22 is branched into two in reducing agent pump 22. The reducing agent not used for exhaust gas treatment is returned from reducing agent pump 22 through return pipe 23 to reducing agent tank 20. The reducing agent used for exhaust gas treatment reaches injection nozzle 28 from reducing agent pump 22 through delivery pipe 25 and is sprayed from injection nozzle 28 into intermediate connection pipe 13.

The exhaust gas from engine 7 flows into exhaust gas treatment device 14 through intermediate connection pipe 13. Intermediate connection pipe 13 is provided upstream of exhaust gas treatment device 14 in the flow of the exhaust gas. The reducing agent suctioned from reducing agent tank 20 is injected into the exhaust gas which flows through intermediate connection pipe 13, through injection nozzle 28 attached to intermediate connection pipe 13. The reducing agent is injected into the upstream side of exhaust gas treatment device 14 in the flow of the exhaust gas. An amount of the reducing agent injected into the exhaust gas is controlled based on a temperature of the exhaust gas which passes through exhaust gas treatment device 14 and a concentration of a nitrogen oxide in the exhaust gas.

Reducing agent tank 20 is arranged at the front end on revolving frame 31 and exhaust gas treatment device 14 is arranged at the rear end on revolving frame 31. With this arrangement, supply pipe 21 and delivery pipe 25 for transferring the reducing agent extend in the fore/aft direction of the main body of the hydraulic excavator and extend from the front end toward the rear end of revolving frame 31.

On the right side frame of revolving frame 31, a fuel tank 36, a hydraulic oil tank 38, and a main valve 39 are mounted. Fuel tank 36 stores a fuel to be supplied to engine 7. Hydraulic oil tank 38 stores a hydraulic oil to be supplied to such a hydraulic actuator as hydraulic cylinder 9 (FIG. 1).

Since fuel tank 36 and hydraulic oil tank 38 are large in weight, they are arranged at positions in front of the exhaust gas treatment unit, in consideration of weight balance on revolving frame 31. Taking into account operability in an operation for replenishing fuel tank 36 with a fuel, fuel tank 36 is arranged closer to a side end of revolving frame 31 than hydraulic oil tank 38. Fuel tank 36 and hydraulic oil tank 38 are each formed as a pressure-resistant tank in a parallelepiped shape. A front surface of each of fuel tank 36 and hydraulic oil tank 38 is formed as a rear wall of a valve room 97 accommodating main valve 39.

Main valve 39 is formed as an assembly of a large number of control valves and pilot valves. Main valve 39 supplies and discharges a hydraulic oil suctioned from hydraulic oil tank 38 and transferred by a not-shown hydraulic pump to such a hydraulic actuator as hydraulic cylinder 9 shown in FIG. 1, as well as a motor for travel and a motor for swing which are not shown. Thus, main valve 39 actuates the vehicular body of hydraulic excavator 1 and work implement 4 in response to an operation by an operator.

Since main valve 39 is smaller in weight than fuel tank 36 and hydraulic oil tank 38, it is arranged in front of fuel tank 36 and hydraulic oil tank 38, in consideration of weight balance on revolving frame 31. Main valve 39 is arranged in the rear of reducing agent tank 20.

Valve room 97 accommodating main valve 39 and a tank room 92 accommodating reducing agent tank 20 are partitioned by a partition 80. Partition 80 is arranged in the rear of reducing agent tank 20 and in front of main valve 39, and arranged between reducing agent tank 20 and main valve 39. Partition 80 is interposed between reducing agent tank 20 and main valve 39 in the fore/aft direction of upper revolving unit 3. Partition 80 is formed as a front wall of valve room 97. Partition 80 is formed as a rear wall of tank room 92.

Figure 3:
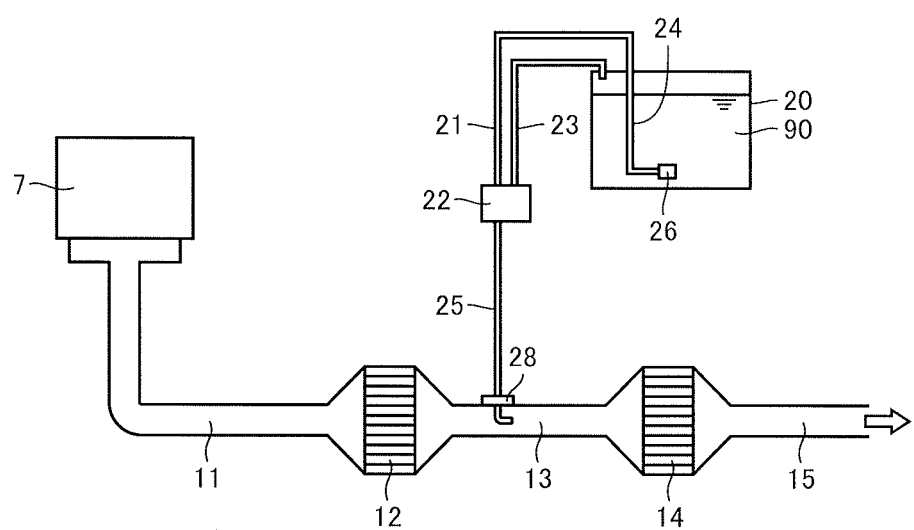
FIG. 3 is a functional diagram schematically showing a path for a reducing agent and an exhaust path for an exhaust gas from an engine.

FIG. 3 is a functional diagram schematically showing a path for the reducing agent and an exhaust path for the exhaust gas from engine 7 in hydraulic excavator 1 in the present embodiment. As shown in FIG. 3, the exhaust gas emitted from engine 7 is exhausted from exhaust stack 15 to the outside of a vehicle after it successively passed through exhaust pipe 11, exhaust gas treatment device 12, intermediate connection pipe 13, and exhaust gas treatment device 14. Injection nozzle 28 is provided in intermediate connection pipe 13 upstream of exhaust gas treatment device 14 in the flow of the exhaust gas.

A reducing agent 90 is stored in reducing agent tank 20. A suction pipe 24 in which reducing agent 90 which flows out of reducing agent tank 20 flows is arranged in reducing agent tank 20. A strainer (a filter) 26 is connected to a tip end of suction pipe 24. Suction pipe 24 is coupled to supply pipe 21. Reducing agent 90 suctioned from reducing agent tank 20 is transferred by reducing agent pump 22 and reaches injection nozzle 28 after it successively passed through supply pipe 21 and delivery pipe 25. Reducing agent 90 not used for exhaust gas treatment is returned to reducing agent tank 20 from reducing agent pump 22 through return pipe 23.

Injection nozzle 28 has a function as a reducing agent injector for injecting reducing agent 90 suctioned from reducing agent tank 20 to the upstream side of the exhaust gas relative to exhaust gas treatment device 14. Injection nozzle 28 supplies reducing agent 90 into the exhaust gas which flows through intermediate connection pipe 13. A concentration of a nitrogen oxide in the exhaust gas lowers as a result of reaction of the nitrogen oxide contained in the exhaust gas with reducing agent 90 in exhaust gas treatment device 14. In a case that a urea solution is employed as reducing agent 90, the urea solution is decomposed in intermediate connection pipe 13 and converted to ammonia, so that the nitrogen oxide is decomposed to harmless nitrogen and oxygen as a result of reaction between the nitrogen oxide and ammonia. An exhaust gas of which amount of nitrogen oxide has lowered to an appropriate value is emitted through exhaust stack 15.

Figure 4:
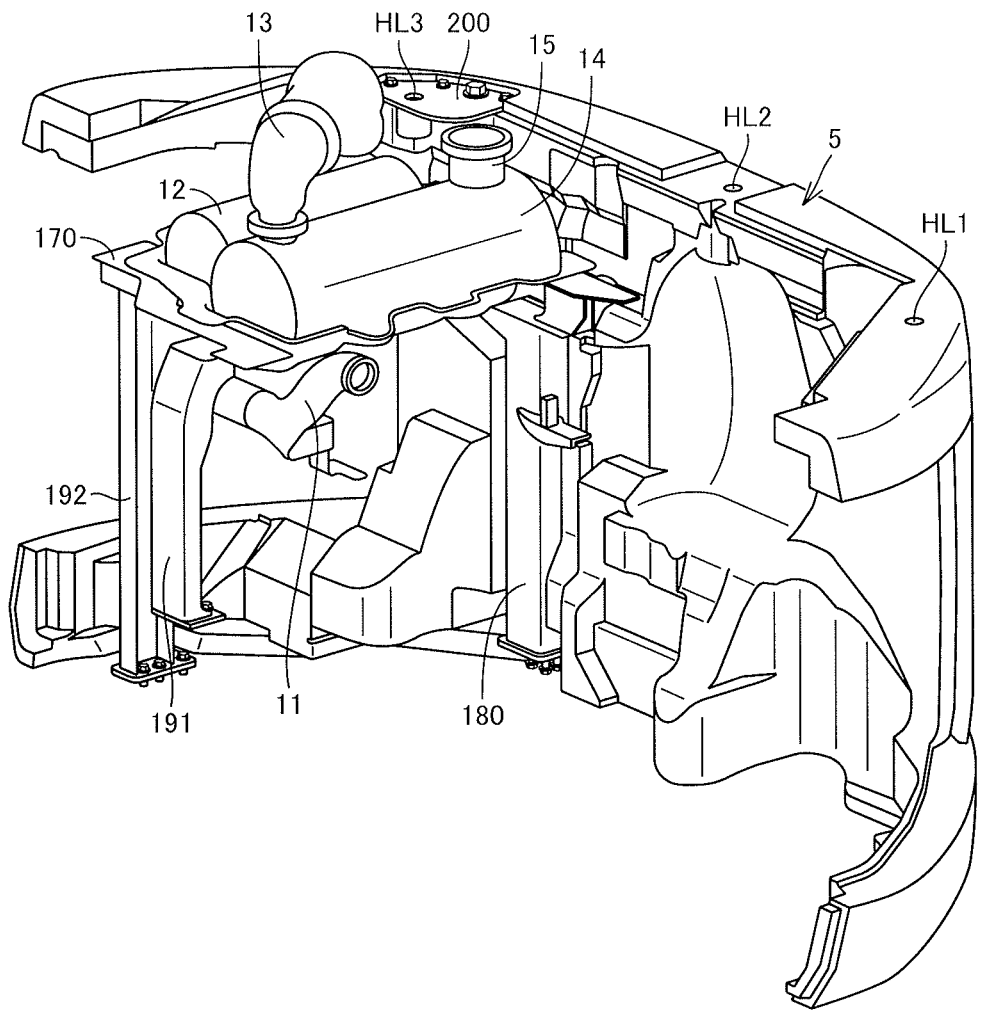
FIG. 4 is a perspective view showing arrangement of an exhaust gas treatment device relative to a counterweight.
Figure 5:
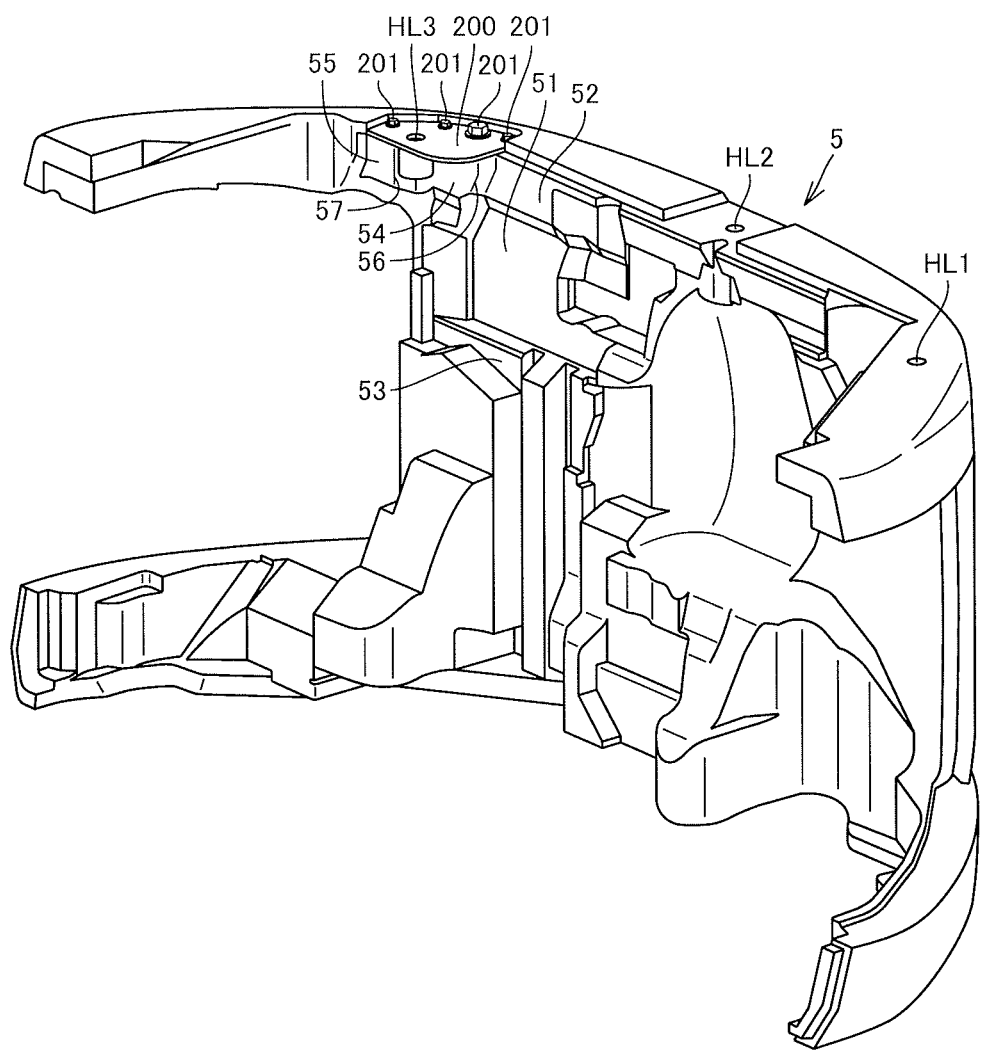
FIG. 5 is a perspective view showing a structure of the counterweight.

FIG. 4 is a perspective view showing arrangement of exhaust gas treatment devices 32 and 14 relative to counterweight 5. FIG. 5 is a perspective view showing a structure of counterweight 5. FIGS. 4 and 5 illustrate counterweight 5 viewed from forward left.

Exhaust gas treatment devices 12 and 14 are supported by a pan-shaped bracket 170. Bracket 170 is mounted on a leg portion. The leg portion is constituted of a rear leg portion 180, a front leg portion 191, and a right leg portion 192. Bracket 170 is fixed to the leg portion through joint with a bolt. The leg portion is fixed to revolving frame 31. The leg portion supports exhaust gas treatment devices 12 and 14 at three locations against revolving frame 31, with bracket 170 being interposed. Thus, exhaust gas treatment devices 12 and 14 large in weight are supported securely over revolving frame 31.

Counterweight 5 is arranged on revolving frame 31 in the rear of engine 7. Counterweight 5 has an inner peripheral surface forming a rear wall of the engine compartment. The inner peripheral surface of counterweight 5 is opposed to each device mounted on revolving frame 31, such as engine 7, fan 8, and exhaust gas treatment devices 12 and 14 shown in FIG. 2. As shown in FIGS. 4 and 5, on the inner peripheral surface of counterweight 5, a complicated projecting and recessed shape is formed such that a volume of counterweight 5 can be maximized in consideration of arrangement of each device adjacent to counterweight 5.

A part or the entirety of rear leg portion 180 is fitted into a recess formed in counterweight 5 such that counterweight 5 and rear leg portion 180 are arranged as combined. Thus, as shown in FIG. 4, exhaust gas treatment devices 12 and 14 can be arranged in proximity to counterweight 5.

In the arrangement shown in FIG. 4 in which rear leg portion 180 is arranged in the recess in the inner peripheral surface of counterweight 5 and rear leg portion 180 and counterweight 5 are combined with each other, rear leg portion 180 is not fixed to counterweight 5. Exhaust gas treatment devices 12 and 14 supported by the leg portion including rear leg portion 180 against revolving frame 31 and counterweight 5 are mounted on revolving frame 31 independently of and separately from each other.

In an upper surface of counterweight 5, holes for lifting HL1, HL2, and HL3 are formed. Holes for lifting HL1, HL2, and HL3 have a function as a lift portion used in an operation for lifting counterweight 5. Counterweight 5 has a plurality of lift portions in its upper surface.

A lifting jig such as an eyebolt or a shackle is fixed to each of holes for lifting HL1, HL2, and HL3 and a lifting wire is coupled to the lifting jig. In such a state, counterweight 5 is lifted by lifting the lifting wire. The lift portion is not limited to holes for lifting HL1, HL2, and HL3, and a member including an opening for catching a lifting hook may implement the lift portion as protruding from the upper surface of counterweight 5.

Holes for lifting HL1 and HL2 are formed as being recessed in the upper surface of counterweight 5. Hole for lifting HL1 is provided on the left in the lateral direction of revolving frame 31. Hole for lifting HL2 is provided in the central portion in the lateral direction of revolving frame 31. Hole for lifting HL1 is formed as a left lift portion. Hole for lifting HL2 is formed as a central lift portion.

An auxiliary plate 200 is fixed to counterweight 5 with a plurality of fasteners 201 such as a bolt. Auxiliary plate 200 has a shape like a flat plate. Hole for lifting HL3 is provided in auxiliary plate 200. Hole for lifting HL3 is formed as a through hole which passes through auxiliary plate 200. Auxiliary plate 200 is detached from counterweight 5 by detaching fastener 201. Auxiliary plate 200 is provided to be attachable to and detachable from counterweight 5. Auxiliary plate 200 is arranged on the right in the lateral direction of revolving frame 31. Hole for lifting HL3 is formed as a right lift portion.

As shown in FIG. 5, the inner peripheral surface of counterweight 5 has a first surface portion 51, a second surface portion 52, a third surface portion 53, a fourth surface portion 54, and a fifth surface portion 55. Second surface portion 52 is provided above first surface portion 51. Third surface portion 53 is provided below first surface portion 51. Fourth surface portion 54 is arranged on the right of first surface portion 51 and second surface portion 52 in the lateral direction of revolving frame 31. Fifth surface portion 55 is arranged on the right of fourth surface portion 54 in the lateral direction of revolving frame 31.

First surface portion 51 and fourth surface portion 54 are provided in the order of first surface portion 51 and fourth surface portion 54 from the center toward the end in the lateral direction of revolving frame 31. Second surface portion 52, fourth surface portion 54, and fifth surface portion 55 are provided in the order of second surface portion 52, fourth surface portion 54, and fifth surface portion 55 from the center toward the end in the lateral direction of revolving frame 31. Fourth surface portion 54 is vertically formed across a position on the right of first surface portion 51 in the lateral direction of revolving frame 31 and a position on the right of second surface portion 52 in the lateral direction of revolving frame 31.

First surface portion 51 forms a part of the inner peripheral surface of counterweight 5. First surface portion 51 is recessed relative to second surface portion 52 above first surface portion 51 and relative to third surface portion 53 below first surface portion 51. First surface portion 51 is formed as a recess recessed relative to second surface portion 52 and third surface portion 53.

Fourth surface portion 54 is formed on an end side relative to first surface portion 51 and second surface portion 52 in the lateral direction of revolving frame 31 in a plan view. Fourth surface portion 54 protrudes forward relative to first surface portion 51, toward the front of revolving frame 31. Fourth surface portion 54 protrudes forward relative to second surface portion 52, toward the front of revolving frame 31.

Fifth surface portion 55 is formed on the end side relative to fourth surface portion 54 in the lateral direction of revolving frame 31 in a plan view. Fifth surface portion 55 protrudes forward relative to fourth surface portion 54, toward the front of revolving frame 31.

The inner peripheral surface of counterweight 5 has step portions 56 and 57. Since fourth surface portion 54 protrudes forward relative to first surface portion 51 and second surface portion 52 toward the front of revolving frame 31, step portion 56 is formed between first surface portion 51 and fourth surface portion 54 and between second surface portion 52 and fourth surface portion 54. Similarly, since fifth surface portion 55 protrudes forward relative to fourth surface portion 54 toward the front of revolving frame 31, step portion 57 is formed between fourth surface portion 54 and fifth surface portion 55.

An edge portion of first surface portion 51 on the right in the lateral direction of revolving frame 31 is provided on the right end side of revolving frame 31, relative to a right edge portion of second surface portion 52. The edge portion of second surface portion 52 on the right in the lateral direction of revolving frame 31 is provided on the central side in the lateral direction of revolving frame 31, relative to the right edge portion of first surface portion 51. Step portion 56 is formed along the right edge portions of first surface portion 51 and second surface portion 52. Step portion 56 is closer to the center in the lateral direction of revolving frame 31, toward the upward direction.

Figure 6:
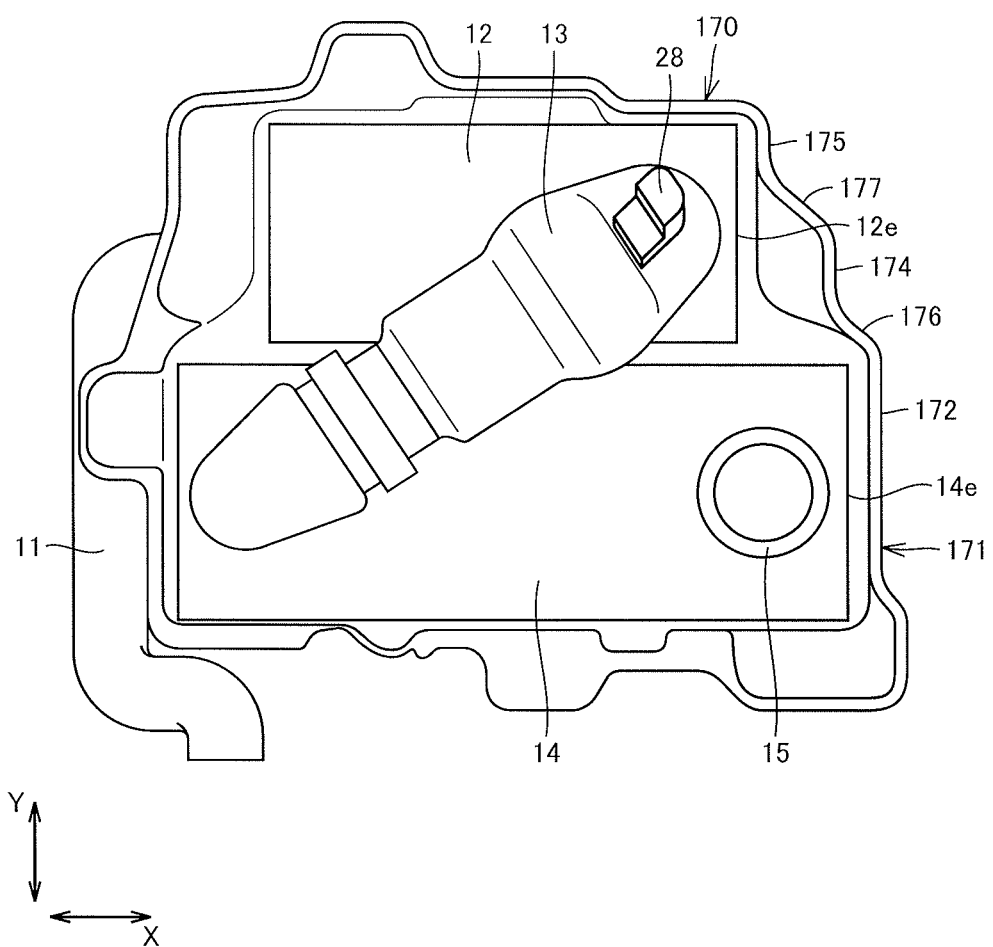
FIG. 6 is a plan view showing a schematic structure of an exhaust gas treatment unit.

FIG. 6 is a plan view showing a schematic structure of the exhaust gas treatment unit. The exhaust gas treatment unit is a unit for treating and purifying the exhaust gas emitted from engine 7, and mainly includes exhaust gas treatment devices 12 and 14, intermediate connection pipe 13, exhaust stack 15, and injection nozzle 28 for a reducing agent. The exhaust gas emitted from engine 7 flows sequentially through exhaust pipe 11, exhaust gas treatment device 12, intermediate connection pipe 13, exhaust gas treatment device 14, and exhaust stack 15.

Exhaust gas treatment devices 12 and 14 are arranged such that a longitudinal direction of each of them extends along the fore/aft direction (a lateral direction in FIG. 6) of revolving frame 31. Exhaust gas treatment devices 12 and 14 are disposed in the order of exhaust gas treatment device 14 and exhaust gas treatment device 12 from the center (a lower portion in FIG. 6) toward the end (an upper portion in FIG. 6) in the lateral direction (a vertical direction in FIG. 6) of revolving frame 31. Exhaust gas treatment device 12 is smaller in dimension in the longitudinal direction than exhaust gas treatment device 14.

Exhaust gas treatment device 12 has a rear end 12e. Exhaust gas treatment device 14 has a rear end 14e. Rear end 12e of exhaust gas treatment device 12 is arranged further forward relative to rear end 14e of exhaust gas treatment device 14. In the fore/aft direction of revolving frame 31, exhaust gas treatment device 12 and exhaust gas treatment device 14 are arranged as being displaced (being offset). In the lateral direction of revolving frame 31, exhaust gas treatment device 12 and exhaust gas treatment device 14 are disposed adjacent to each other.

Exhaust gas treatment devices 12 and 14 are supported by pan-shaped bracket 170. Bracket 170 has a rear edge 171 in the rear portion of revolving frame 31. Rear edge 171 has edge portions 172 and 174 to 177. Edge portion 172 is provided along rear end 14e of exhaust gas treatment device 14. Edge portion 174 is provided along rear end 12e of exhaust gas treatment device 12.

Figure 7:
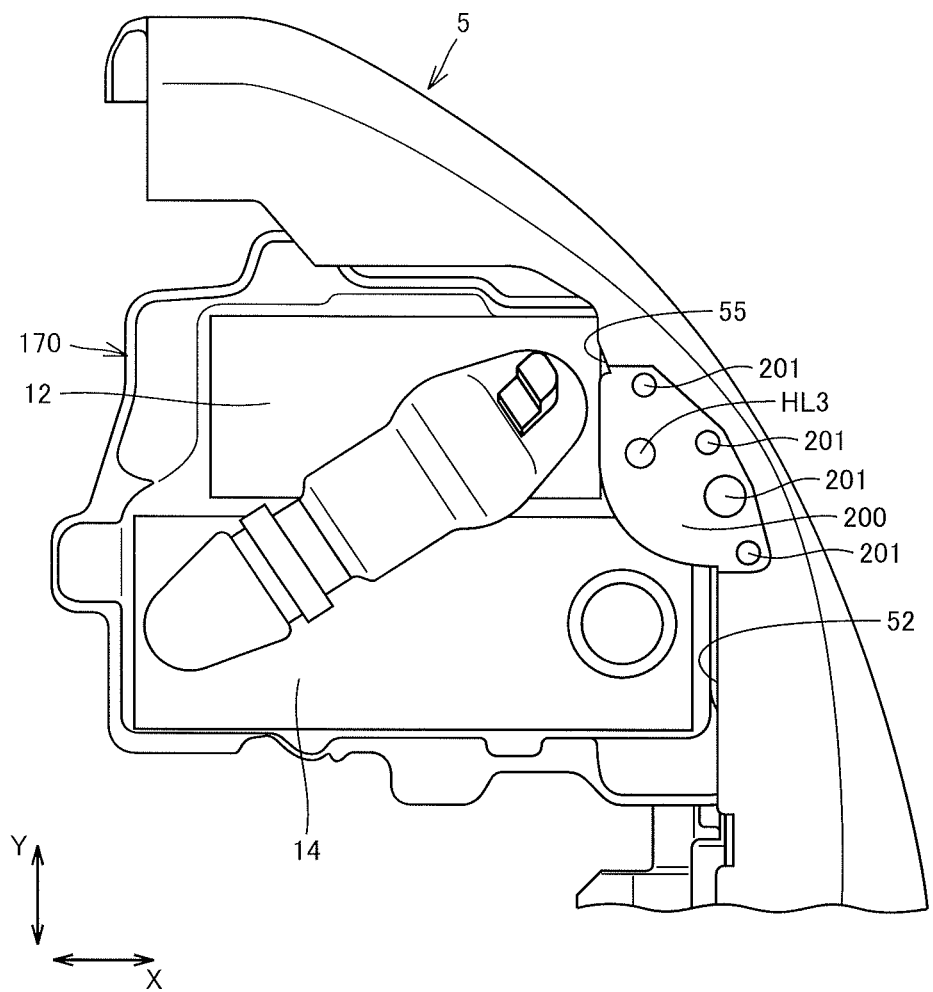
FIG. 7 is a plan view showing arrangement of the exhaust gas treatment device relative to the counterweight.

FIG. 7 is a plan view showing arrangement of exhaust gas treatment devices 12 and 14 relative to counterweight 5. FIG. 7 and FIGS. 8 to 10 which will be described later illustrate relative positions between exhaust gas treatment devices 12 and 14 or bracket 170 and counterweight 5 while bracket 170 on which exhaust gas treatment devices 12 and 14 are mounted is supported on revolving frame 31 and counterweight 5 is also supported on revolving frame 31 independently of exhaust gas treatment devices 12 and 14.

FIG. 7 illustrates a state that exhaust gas treatment devices 12 and 14 and counterweight 5 are two-dimensionally viewed from above. FIG. 7 also illustrates a state that auxiliary plate 200 is attached to counterweight 5. As described above, auxiliary plate 200 is attached to counterweight 5 with the use of a plurality of fasteners 201. As shown in FIG. 7, while auxiliary plate 200 is attached to counterweight 5, auxiliary plate 200 is superimposed on exhaust gas treatment devices 12 and 14 in a plan view.

Figure 8:
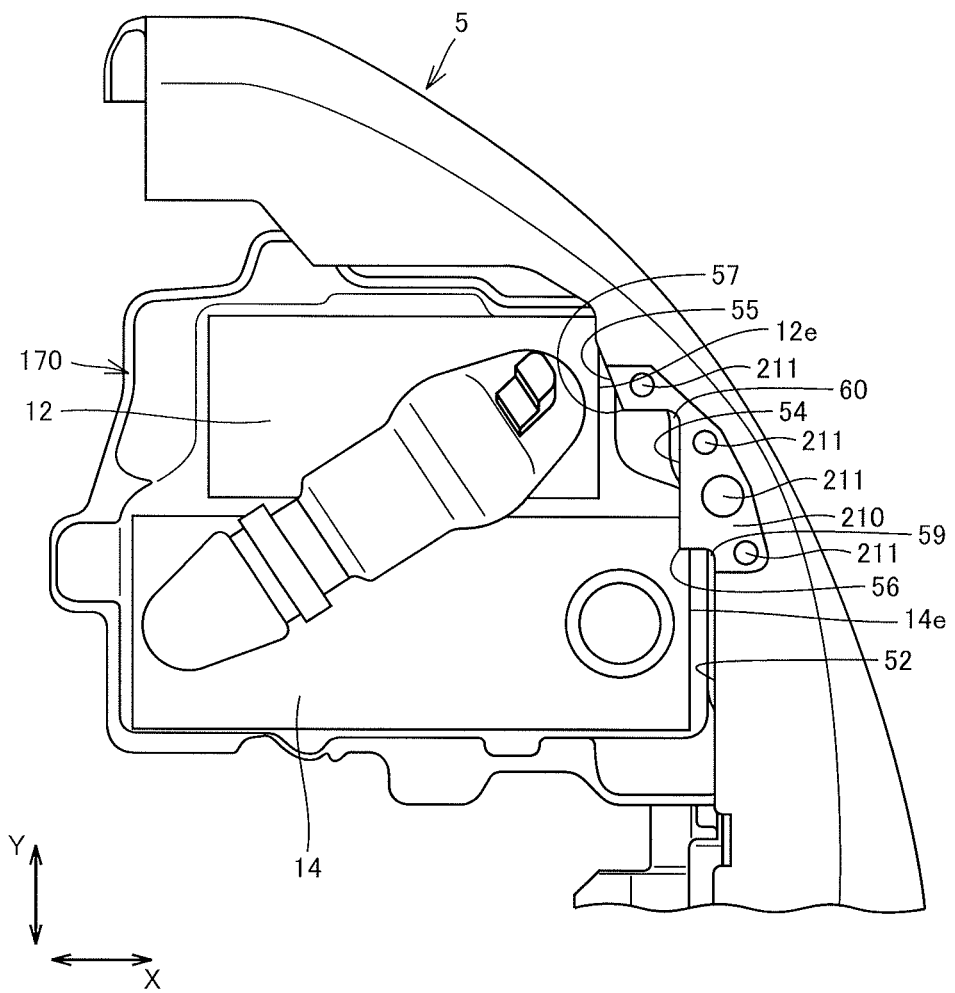
FIG. 8 is a plan view showing a state that an auxiliary plate has been detached.

FIG. 8 is a plan view showing a state that auxiliary plate 200 has been detached. As shown in FIG. 8, a plate attachment portion 210 one step lower than the upper surface of counterweight 5 is formed in counterweight 5. Plate attachment portion 210 has a plurality of holes for fixing 211 formed. By fixing each fastener 201, together with auxiliary plate 200, to each hole for fixing 211, auxiliary plate 200 is attached to counterweight 5.

As described with reference to FIG. 5, first surface portion 51 is formed in a shape recessed relative to second surface portion 52 located above first surface portion 51. Second surface portion 52, fourth surface portion 54, and fifth surface portion 55 protrude forward relative to first surface portion 51. Second surface portion 52 covers rear edge 171 of bracket 170 from above. Therefore, in the plan view shown in FIG. 8, rear edge 171 of bracket 170 is covered with second surface portion 52, fourth surface portion 54, and fifth surface portion 55 of counterweight 5 and cannot visually be recognized.

As shown in FIG. 8, an outer peripheral surface of counterweight 5 has a substantially arc shape in a plan view, and is curved toward the front, from the center toward the end in the lateral direction of revolving frame 31. Second surface portion 52 and fourth surface portion 54 extend in the lateral direction of revolving frame 31. Second surface portion 52 and fourth surface portion 54 come closer to the outer peripheral surface of counterweight 5 toward the edge portion on the right in the lateral direction of revolving frame 31. Depressions 59 and 60 are formed in the edge portions of second surface portion 52 and fourth surface portion 54 on the right in the lateral direction of revolving frame 31, respectively.

Depressions 59 and 60 are formed in such a shape that a part of the inner peripheral surface of counterweight 5 is recessed toward the outer peripheral surface in a plan view. Depressions 59 and 60 are recessed relative to step portions 56 and 57 and formed at positions closer to the outer peripheral surface of counterweight 5 than step portions 56 and 57. Step portions 56 and 57 protrude from the inner peripheral surface around the same. Depressions 59 and 60 are recessed relative to the inner peripheral surface around the same.

Based on comparison between the state that auxiliary plate 200 is attached to counterweight 5 shown in FIG. 7 and the state that auxiliary plate 200 has been detached from counterweight 5 shown in FIG. 8, auxiliary plate 200 is superimposed on depressions 59 and 60 in a plan view while it is attached to counterweight 5.

Figure 9:
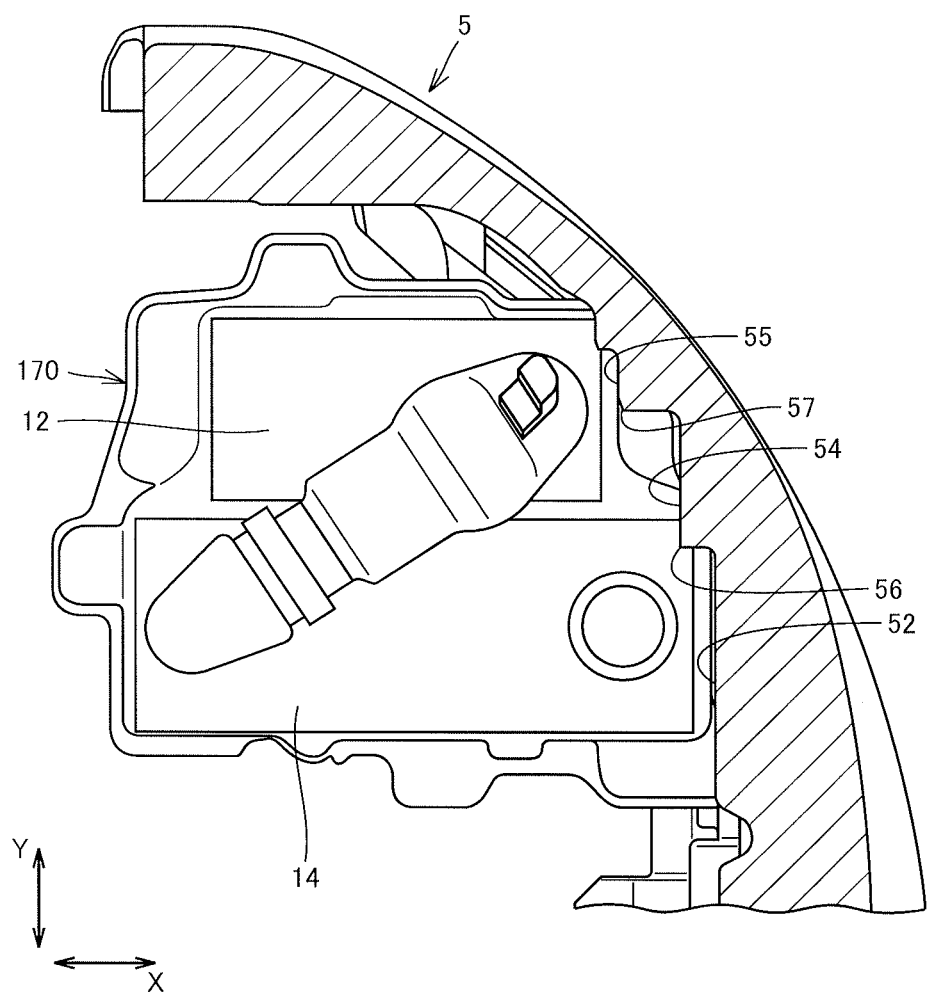
FIG. 9 is a first partial cross-sectional view showing arrangement of the exhaust gas treatment device relative to the counterweight.

FIG. 9 is a first partial cross-sectional view showing arrangement of exhaust gas treatment devices 12 and 14 relative to counterweight 5. FIG. 9 illustrates a cross-section of counterweight 5 which passes through second surface portion 52, fourth surface portion 54, and fifth surface portion 55 shown in FIG. 5 and extends along a plane in parallel to revolving frame 31.

Since second surface portion 52, fourth surface portion 54, and fifth surface portion 55 protrude forward relative to first surface portion 51, rear edge 171 of bracket 170 cannot visually be recognized either in the cross-section of counterweight 5 shown in FIG. 9, as in FIG. 8.

Figure 10:
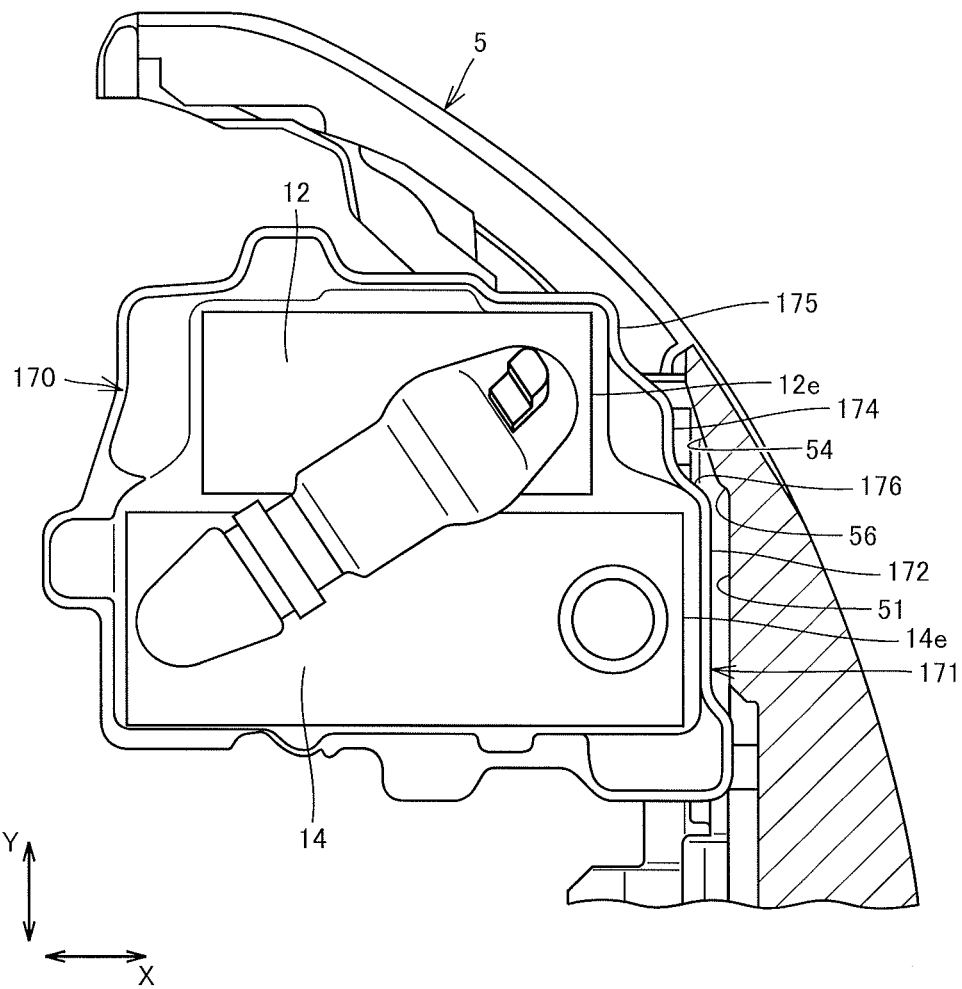
FIG. 10 is a second partial cross-sectional view showing arrangement of the exhaust gas treatment device relative to the counterweight.

FIG. 10 is a second partial cross-sectional view showing arrangement of exhaust gas treatment devices 12 and 14 relative to counterweight 5. FIG. 10 illustrates a cross-section of counterweight 5 which passes through first surface portion 51 and fourth surface portion 54 shown in FIG. 5 and extends along a plane in parallel to revolving frame 31.

As shown in FIG. 10, rear edge 171 of bracket 170 supporting exhaust gas treatment devices 12 and 14 is arranged as being opposed to first surface portion 51, fourth surface portion 54, and step portion 56 of counterweight 5. Edge portion 172 of rear edge 171 is opposed to first surface portion 51 and edge portion 174 thereof is opposed to fourth surface portion 54.

Counterweight 5 is arranged in the rear of exhaust gas treatment devices 12 and 14. Counterweight 5 is arranged in the rear of bracket 170 supporting exhaust gas treatment devices 12 and 14. As shown in FIG. 10, in a plan view, edge portion 172 of bracket 170 protrudes toward the rear where counterweight 5 is arranged, relative to edge portion 174. Edge portion 172 is arranged closer to counterweight 5 than edge portion 174. A gap between edge portion 172 and first surface portion 51 of counterweight 5 is smaller than a gap between edge portion 174 and fourth surface portion 54.

Edge portion 176 provided between edge portion 172 and edge portion 174 is opposed to step portion 56 formed between first surface portion 51 and fourth surface portion 54 of counterweight 5. First surface portion 51 is opposed to rear end 14e of exhaust gas treatment device 14. Fourth surface portion 54 is opposed to rear end 12e of exhaust gas treatment device 12. First surface portion 51 is arranged rearward relative to the fourth surface portion. Step portion 56 is formed between first surface portion 51 and fourth surface portion 54 protruding forward relative to the first surface portion.

Exhaust gas treatment devices 12 and 14 are not fixed to counterweight 5 but supported by revolving frame 31 independently of counterweight 5. Therefore, exhaust gas treatment devices 12 and 14 can be detached from hydraulic excavator 1 while counterweight 5 remains fixed to revolving frame 31. Thus, maintenance of exhaust gas treatment devices 12 and 14 is facilitated.

Since counterweight 5 is superimposed on bracket 170 in a plan view, movement of bracket 170 supporting exhaust gas treatment devices 12 and 14 upward as it is will interfere with counterweight 5 and exhaust gas treatment devices 12 and 14 cannot be detached. Then, in detachment of exhaust gas treatment devices 12 and 14, exhaust gas treatment devices 12 and 14 should be moved diagonally upward so as to avoid interference with counterweight 5.

Figure 11:
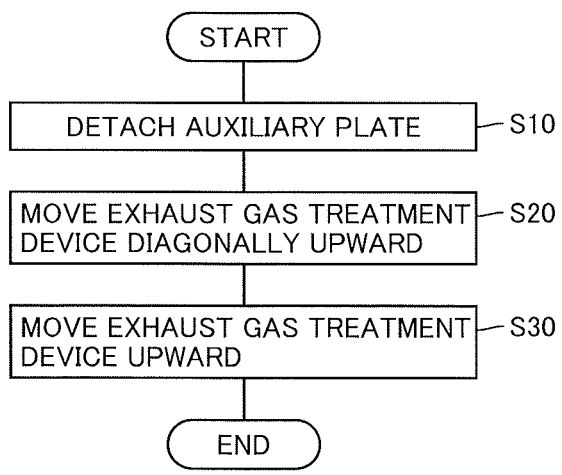
FIG. 11 is a flowchart showing a method of detaching the exhaust gas treatment device from the hydraulic excavator.

FIG. 11 is a flowchart showing a method of detaching exhaust gas treatment devices 12 and 14 from hydraulic excavator 1. In detaching exhaust gas treatment devices 12 and 14 from hydraulic excavator 1 from the state that exhaust gas treatment devices 12 and 14 are mounted on revolving frame 31 shown in FIGS. 7 to 10, initially, in a step (S10), auxiliary plate 200 is detached. Thus, the state that auxiliary plate 200 has been detached from counterweight 5 shown in FIG. 8 is established. In succession, in a step (S20), exhaust gas treatment devices 12 and 14 are moved diagonally upward.

Figure 12:
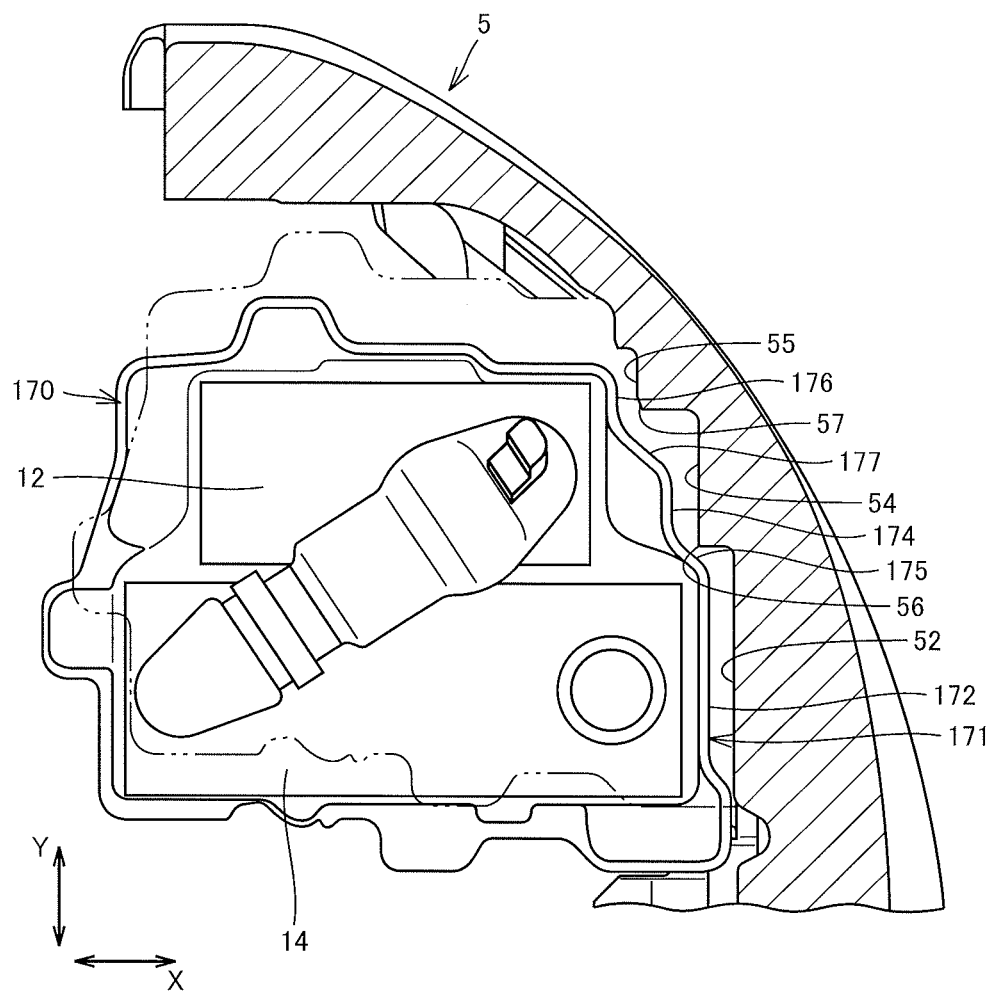
FIG. 12 is a partial cross-sectional view showing arrangement of the exhaust gas treatment device during an operation for detachment of the exhaust gas treatment device from the hydraulic excavator.

FIG. 12 is a partial cross-sectional view showing arrangement of exhaust gas treatment devices 12 and 14 during an operation for detaching exhaust gas treatment devices 12 and 14 from hydraulic excavator 1. FIG. 12 illustrates a cross-section of counterweight 5 the same as in FIG. 9. A chain double dotted line shown in FIG. 12 shows arrangement of bracket 170 in FIG. 9.

In detaching exhaust gas treatment devices 12 and 14 from hydraulic excavator 1, exhaust gas treatment devices 12 and 14 are moved away from counterweight 5 to forward left of revolving frame 31, from the arrangement shown in FIG. 10. FIG. 12 illustrates arrangement of bracket 170 at the time when bracket 170 is moved diagonally upward to a position where rear edge 171 is opposed to second surface portion 52, fourth surface portion 54, and fifth surface portion 55 of counterweight 5. Bracket 170 shown in FIG. 12 has been moved in a lower left direction in the figure, as compared with the arrangement at the time when it was mounted on revolving frame 31 which is shown with the double dotted line in FIG. 12. Thus, interference between bracket 170 and counterweight 5 is avoided.

Figure 13:
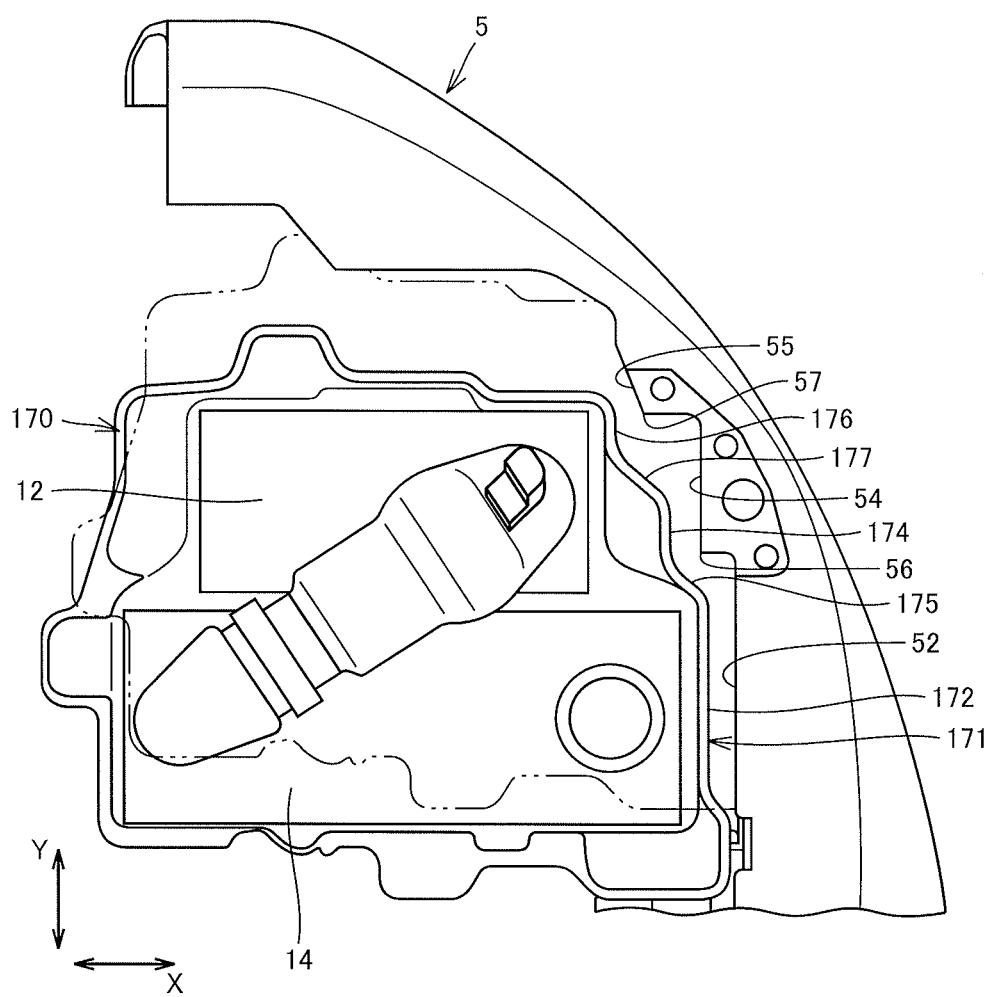
FIG. 13 is a plan view showing arrangement of the exhaust gas treatment device during an operation for detachment of the exhaust gas treatment device from the hydraulic excavator.

FIG. 13 is a plan view showing arrangement of exhaust gas treatment devices 12 and 14 during an operation for detaching exhaust gas treatment devices 12 and 14 from hydraulic excavator 1. FIG. 13 illustrates counterweight 5 two-dimensionally viewed from above, as in FIG. 8. A chain double dotted line in FIG. 13 shows arrangement of bracket 170 in FIG. 8.

FIG. 13 illustrates arrangement of bracket 170 at the time when bracket 170 is moved to a position above the upper surface of counterweight 5. The bracket shown in FIG. 13 has been moved in the lower left direction in the figure, as compared with the arrangement at the time when it was mounted on revolving frame 31 which is shown with the double dotted line in FIG. 13.

Based on comparison between FIGS. 12 and 13, exhaust gas treatment devices 12 and 14 shown in FIG. 13 have been moved to positions distant from counterweight 5 in a plan view, more than exhaust gas treatment devices 12 and 14 shown in FIG. 12. By moving exhaust gas treatment devices 12 and 14 diagonally upward until counterweight 5 and exhaust gas treatment devices 12 and 14 are no longer superimposed on each other in the plan view shown in FIG. 13, interference of exhaust gas treatment devices 12 and 14 and bracket 170 with counterweight 5 is avoided.

Referring back to FIG. 11, after exhaust gas treatment devices 12 and 14 are moved diagonally upward until counterweight 5 and exhaust gas treatment devices 12 and 14 are no longer superimposed on each other in the plan view, exhaust gas treatment devices 12 and 14 are moved upward. Exhaust gas treatment devices 12 and 14 are thus detached from hydraulic excavator 1 without interference with counterweight 5.

Figure 14:
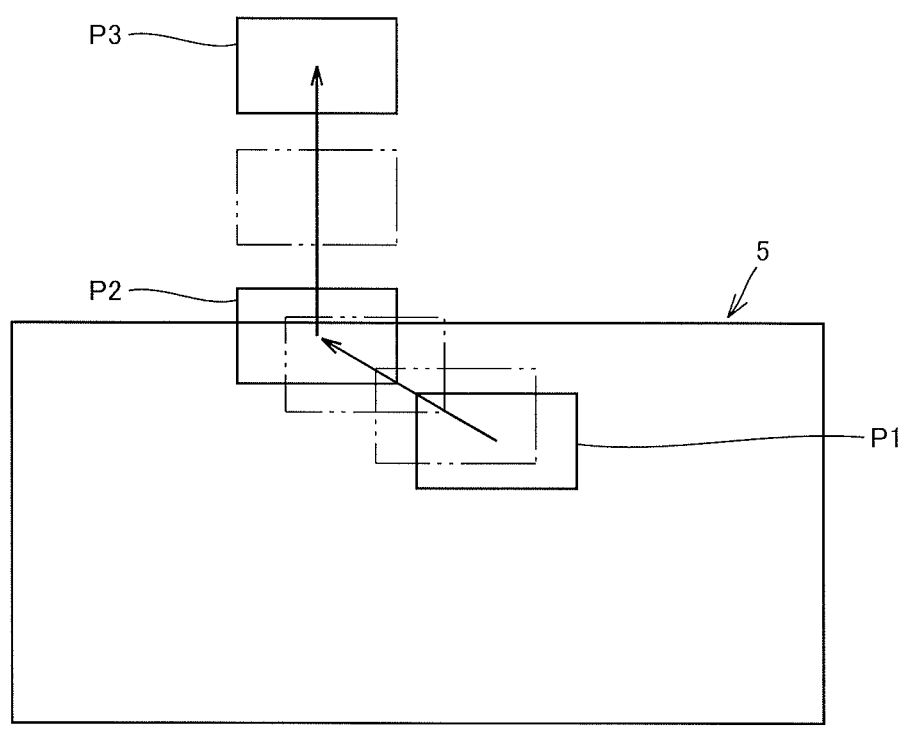
FIG. 14 is a conceptual diagram showing a path along which the exhaust gas treatment device is moved during the operation for detachment of the exhaust gas treatment device from the hydraulic excavator.

FIG. 14 is a conceptual diagram showing a path along which exhaust gas treatment devices 12 and 14 are moved during an operation for detaching exhaust gas treatment devices 12 and 14 from hydraulic excavator 1. A position P1 shown in FIG. 14 indicates arrangement of exhaust gas treatment devices 12 and 14 mounted on revolving frame 31. A position P2 indicates arrangement of exhaust gas treatment devices 12 and 14 not superimposed on counterweight 5 in a plan view. A position P3 indicates arrangement of exhaust gas treatment devices 12 and 14 detached from hydraulic excavator 1. A chain double dotted line in FIG. 14 shows arrangement of exhaust gas treatment devices 12 and 14 from position P1 to position P2 and arrangement of exhaust gas treatment devices 12 and 14 from position P2 to position P3.

As shown in FIG. 14, exhaust gas treatment devices 12 and 14 and bracket 170 are moved diagonally upward from position P1 where they are mounted on revolving frame 31 to position P2 where they are not superimposed on counterweight 5 in a plan view. Thereafter, exhaust gas treatment devices 12 and 14 and bracket 170 are moved vertically upward from position P2 to position P3. Even when exhaust gas treatment devices 12 and 14 and bracket 170 are moved vertically upward after they are moved diagonally upward until they are no longer superimposed on counterweight 5 in a plan view, interference with counterweight 5 does not take place.

A function and effect of the present embodiment will now be described.

In hydraulic excavator 1 in the present embodiment, as shown in FIG. 5, a plurality of holes for lifting HL1, HL2, and HL3 are formed in the upper surface of counterweight 5. Holes for lifting HL1, HL2, and HL3 have a function as a lift portion used during an operation for lifting counterweight 5. Hole for lifting HL3 is formed in auxiliary plate 200. As shown in FIGS. 7 and 8, auxiliary plate 200 is provided to be attachable to and detachable from counterweight 5. Auxiliary plate 200 is superimposed on exhaust gas treatment devices 12 and 14 in a plan view while it is attached to counterweight 5.

By forming hole for lifting HL3 used in an operation for lifting counterweight 5 in auxiliary plate 200 attachable to and detachable from counterweight 5, counterweight 5 can be lifted by making use of hole for lifting HL3 with auxiliary plate 200 being attached to counterweight 5. Therefore, operability during lifting of counterweight 5 is not lowered.

For formation of a hole for lifting in counterweight 5 itself, counterweight 5 should be formed to have a large thickness for securing sufficient strength of counterweight 5 in spite of formation of a hole for lifting. When a thickness of counterweight 5 is increased, exhaust gas treatment devices 12 and 14 should be arranged further forward in order to prevent interference with counterweight 5. Formation of hole for lifting HL3 in auxiliary plate 200 as in the present embodiment can allow decrease in thickness of counterweight 5. Therefore, even when exhaust gas treatment devices 12 and 14 are arranged further rearward, interference between exhaust gas treatment devices 12 and 14 and counterweight 5 can be prevented and a limited area of revolving frame 31 can effectively be made use of.

Exhaust gas treatment devices 12 and 14 have to be detached from hydraulic excavator 1 for maintenance. By detaching auxiliary plate 200 covering exhaust gas treatment devices 12 and 14 from counterweight 5, a wide path for detachment of exhaust gas treatment devices 12 and 14 can be secured, and interference between exhaust gas treatment devices 12 and 14 and counterweight 5 can be suppressed. By diagonally lifting exhaust gas treatment devices 12 and 14 with auxiliary plate 200 having been detached, only exhaust gas treatment devices 12 and 14 can readily be detached without the need for detachment of counterweight 5 large in weight.

As shown in FIG. 8, counterweight 5 has depressions 59 and 60 formed, which are formed as a part of its inner peripheral surface is recessed toward the outer peripheral surface in a plan view. As shown in FIG. 7, auxiliary plate 200 is superimposed on depressions 59 and 60 in the plan view while it is attached to counterweight 5.

Since depressions 59 and 60 are formed in counterweight 5, a wider path for detachment of exhaust gas treatment devices 12 and 14 can be secured by detaching auxiliary plate 200 superimposed on depressions 59 and 60 from counterweight 5. Therefore, operability during detachment of exhaust gas treatment devices 12 and 14 can further be improved.

As shown in FIG. 2, exhaust gas treatment devices 12 and 14 are arranged on the right in the lateral direction of revolving frame 31. As shown in FIG. 5, in counterweight 5, hole for lifting HL1 is formed on the left in the lateral direction of revolving frame 31 and hole for lifting HL2 is formed in the central portion in the lateral direction of revolving frame 31.

In the lateral direction of revolving frame 31, hole for lifting HL1 is formed on the left, hole for lifting HL2 is formed in the central portion, and hole for lifting HL3 is formed in auxiliary plate 200 superimposed on exhaust gas treatment devices 12 and 14 arranged on the right. Therefore, counterweight 5 can be lifted at three points with the use of holes for lifting HL1, HL2, and HL3. Therefore, counterweight 5 can be lifted in a stable attitude.

As shown in FIGS. 7 to 10, exhaust gas treatment devices 12 and 14 for treating the exhaust gas from the engine are provided such that a longitudinal direction of each of them extends along the fore/aft direction of revolving frame 31. Exhaust gas treatment device 14 and exhaust gas treatment device 12 are disposed in this order from centerline CL (FIG. 2) in the lateral direction of revolving frame 31 toward the end of revolving frame 31. Rear end 12e of exhaust gas treatment device 12 is arranged forward relative to rear end 14e of exhaust gas treatment device 14. Counterweight 5 has, on its inner peripheral surface, second surface portion 52 on the central side in the lateral direction of revolving frame 31 in the plan view and fourth surface portion 54 on the end side. As shown in FIG. 9, fourth surface portion 54 protrudes forward relative to second surface portion 52, and step portion 56 is formed between second surface portion 52 and fourth surface portion 54.

Rear end 14e of exhaust gas treatment device 14 on the end side is arranged forward relative to rear end 12e of exhaust gas treatment device 12 on the central side in the lateral direction of revolving frame 31, and exhaust gas treatment devices 12 and 14 are arranged as being displaced (being offset) in the fore/aft direction. Thus, exhaust gas treatment devices 12 and 14 can be arranged along the outer peripheral surface of counterweight 5 curved toward the front, from the center toward the end of revolving frame 31. Exhaust gas treatment devices 12 and 14 can be arranged on the rear side in revolving frame 31 without extending off a radius of swing of the rear end of upper revolving unit 3, and can be arranged in proximity to counterweight 5. Therefore, exhaust gas treatment devices 12 and 14 can appropriately be arranged on revolving frame 31 of which area is limited, and a limited area of revolving frame 31 can effectively be made use of.

Counterweight 5 is optimized to such a shape as allowing efficient arrangement of exhaust gas treatment devices 12 and 14 on hydraulic excavator 1, in conformity with an outer geometry of exhaust gas treatment devices 12 and 14. In conformity with exhaust gas treatment devices 12 and 14 offset in the fore/aft direction, step portion 56 of which end side protrudes forward relative to the central side in the lateral direction of revolving frame 31 in a plan view is formed on the inner peripheral surface of counterweight 5.

Since the recess which is the recessed inner peripheral surface of counterweight 5 is formed on the central side relative to step portion 56, such arrangement that exhaust gas treatment devices 12 and 14 are closer to counterweight 5 is allowed. In addition, since a wide path for detachment of exhaust gas treatment devices 12 and 14 from hydraulic excavator 1 can be secured, detachment of exhaust gas treatment devices 12 and 14 from hydraulic excavator 1 is facilitated. Since the inner peripheral surface of counterweight 5 protrudes forward on the end side relative to step portion 56, a volume of counterweight 5 can be increased. Thus, decrease in weight of counterweight 5 can be suppressed and balance of a vehicular body of hydraulic excavator 1 can be maintained.

As shown in FIG. 10, exhaust gas treatment device 12 is smaller in dimension in the longitudinal direction than exhaust gas treatment device 14. Exhaust gas treatment device 12 relatively smaller in dimension in the longitudinal direction along the fore/aft direction of revolving frame 31 than exhaust gas treatment device 14 has rear end 12e arranged relatively forward and is arranged on the end side in the lateral direction of revolving frame 31. By thus arranging exhaust gas treatment devices 12 and 14, an area necessary for arrangement of exhaust gas treatment devices 12 and 14 on revolving frame 31 can be decreased. Therefore, an area of revolving frame 31 can more effectively be made use of.

In the lateral direction of revolving frame 31, exhaust gas treatment devices 12 and 14 are arranged adjacent to each other. An amount of displacement in arrangement of exhaust gas treatment devices 12 and 14 in the fore/aft direction of revolving frame 31 is set so as to sufficiently secure a length of intermediate connection pipe 13 in consideration of sufficient mixing with the exhaust gas, of the reducing agent introduced in intermediate connection pipe 13 coupling exhaust gas treatment devices 12 and 14 to each other. Thus, the exhaust gas treatment unit including exhaust gas treatment devices 12 and 14 can be compact and exhaust gas treatment performance of exhaust gas treatment device 14 can sufficiently be ensured.

As shown in FIGS. 5 and 7 to 10, step portion 56 is closer to the center in the lateral direction of revolving frame 31, toward the upward direction. Step portion 56 is formed between first surface portion 51 and fourth surface portion 54 and formed between second surface portion 52 above first surface portion 51 and fourth surface portion 54. Step portion 56 between second surface portion 52 and fourth surface portion 54 shown in FIG. 8 is provided on the central side in the lateral direction of revolving frame 31 relative to step portion 56 between first surface portion 51 and fourth surface portion 54 shown in FIG. 7.

In order to facilitate detachment of exhaust gas treatment devices 12 and 14 from hydraulic excavator 1, a cross-sectional shape of counterweight 5 shown in FIG. 7 is desirably the same as a shape of the upper surface of counterweight 5. In this case, however, there is a portion where a thickness of counterweight 5 is excessively small in the upper surface of counterweight 5, which is not preferred in terms of design and strength. By providing step portion 56 in a shape shifted toward the center in the lateral direction in an upper portion rather than in a lower portion as in the present embodiment, exhaust gas treatment devices 12 and 14 can be detached from hydraulic excavator 1 by moving diagonally upward exhaust gas treatment devices 12 and 14 toward the center in the lateral direction, and counterweight 5 having excellent design and strength can be provided.

As shown in FIG. 5, a part of the inner peripheral surface of counterweight 5 implements first surface portion 51. First surface portion 51 is formed as a recess recessed relative to second surface portion 52 above the same and recessed relative to third surface portion 53 below the same.

As shown in FIG. 10, exhaust gas treatment device 14 is arranged at a position facing first surface portion 51 of counterweight 5. By cutting away a part of the inner peripheral surface of counterweight 5 so as to form first surface portion 51 in a recessed shape and forming a recess accepting exhaust gas treatment device 14 in counterweight 5, exhaust gas treatment device 14 can be arranged further rearward. By forming second surface portion 52 above first surface portion 51 and third surface portion 53 below the same as protruding forward relative to first surface portion 51, a weight of counterweight 5 can be increased and strength of counterweight 5 can be improved.

As second surface portion 52 protrudes forward relative to first surface portion 51, as shown in FIG. 8, a part of counterweight 5 is superimposed on exhaust gas treatment devices 12 and 14 in a plan view. A part of counterweight 5 is arranged vertically above exhaust gas treatment devices 12 and 14 mounted on revolving frame 31. A part of exhaust gas treatment devices 12 and 14 is covered with counterweight 5. Counterweight 5 hangs over a part of exhaust gas treatment devices 12 and 14. In a plan view, the inner peripheral surface of counterweight 5 has a portion which is present forward relative to the rear ends of exhaust gas treatment devices 12 and 14.

Thus, since a thickness in the upper surface of counterweight 5 can sufficiently be secured, counterweight 5 having excellent design and strength can be provided. With such a structure as well, by moving diagonally upward exhaust gas treatment devices 12 and 14 toward the front, exhaust gas treatment devices 12 and 14 can be detached from hydraulic excavator 1.

As shown in FIG. 10, hydraulic excavator 1 further includes bracket 170. Exhaust gas treatment devices 12 and 14 are supported by bracket 170. Exhaust gas treatment devices 12 and 14 are supported on revolving frame 31 by bracket 170 as well as by rear leg portion 180, front leg portion 191, and right leg portion 192. Bracket 170 has edge portion 174 extending along rear end 12e of exhaust gas treatment device 12 and edge portion 172 extending along rear end 14e of exhaust gas treatment device 14. In a plan view, edge portion 172 protrudes toward counterweight 5 relative to edge portion 174.

By conforming bracket 170 substantially with a wall surface of counterweight 5 in the plan view shown in FIG. 10, exhaust gas treatment devices 12 and 14 mounted on bracket 170 can be arranged closer to counterweight 5. Therefore, exhaust gas treatment devices 12 and 14 can appropriately be arranged on revolving frame 31.

The method of detaching exhaust gas treatment devices 12 and 14 for detaching exhaust gas treatment devices 12 and 14 from hydraulic excavator 1 in the present embodiment includes the steps of detaching auxiliary plate 200 from counterweight 5 (S10) and moving exhaust gas treatment devices 12 and 14 diagonally upward so as not to interfere with counterweight 5 until counterweight 5 and exhaust gas treatment devices 12 and 14 are no longer superimposed on each other in the plan view (S20) as shown in FIG. 11. By doing so, exhaust gas treatment devices 12 and 14 can be detached from hydraulic excavator 1 without interference between exhaust gas treatment devices 12 and 14 and counterweight 5.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can particularly advantageously be applied to a short tail swing or minimal swing radius hydraulic excavator.

REFERENCE SIGNS LIST 1 hydraulic excavator; 4 work implement; 5 counterweight; 7 engine; 12, 14 exhaust gas treatment device; 12e, 14e rear end; 13 intermediate connection pipe; 20 reducing agent tank; 28 injection nozzle; 31 revolving frame; 51 first surface portion; 52 second surface portion; 53 third surface portion; 54 fourth surface portion; 55 fifth surface portion; 56, 57 step portion; 59, 60 depression; 170 bracket; 171 rear edge; 172, 174, 176, 177 edge portion; 180 rear leg portion; 200 auxiliary plate; 201 fastener; 210 plate attachment portion; and 211 hole for fixing.

The invention claimed is:

1. A hydraulic excavator, comprising:
a revolving frame;
an engine arranged on said revolving frame;
a first exhaust gas treatment device for treating an exhaust gas from said engine;
a counterweight arranged on said revolving frame in a rear of said engine; and
an auxiliary plate attachable to and detachable from said counterweight, which is superimposed on said first exhaust gas treatment device in a plan view while the auxiliary plate is attached to said counterweight,
said counterweight having a plurality of lift portions on an upper surface, and
one of said lift portions being provided in said auxiliary plate.

2. The hydraulic excavator according to claim 1, wherein
said counterweight has a depression formed, which is formed as a part of an inner peripheral surface is recessed toward an outer peripheral surface in a plan view, and
said auxiliary plate is superimposed on said depression in a plan view while the auxiliary plate is attached to said counterweight.

3. The hydraulic excavator according to claim 2, wherein
said first exhaust gas treatment device is arranged on a right in a lateral direction of said revolving frame, and
said lift portion has a left lift portion provided on a left in the lateral direction of said revolving frame and a central lift portion provided in a central portion in the lateral direction of said revolving frame.

4. The hydraulic excavator according to claim 1, wherein
said first exhaust gas treatment device is arranged on a right in a lateral direction of said revolving frame, and
said lift portion has a left lift portion provided on a left in the lateral direction of said revolving frame and a central lift portion provided in a central portion in the lateral direction of said revolving frame.

5. The hydraulic excavator according to claim 1, further comprising a second exhaust gas treatment device for treating the exhaust gas from said engine, wherein
said first exhaust gas treatment device and said second exhaust gas treatment device are disposed in an order of said second exhaust gas treatment device and said first exhaust gas treatment device from a center toward an end in a lateral direction of said revolving frame such that each longitudinal direction extends along a fore/aft direction of said revolving frame, and a rear end of said first exhaust gas treatment device is arranged forward relative to a rear end of said second exhaust gas treatment device, and
said counterweight has, in an inner peripheral surface, such a step portion that an end side protrudes forward relative to a central side in the lateral direction of said revolving frame in a plan view.

6. The hydraulic excavator according to claim 5, wherein
said first exhaust gas treatment device is smaller in dimension in a longitudinal direction than said second exhaust gas treatment device.

7. The hydraulic excavator according to claim 5, wherein
said step portion is closer to a center in the lateral direction of said revolving frame, toward an upward direction.

8. The hydraulic excavator according to claim 5, wherein
said counterweight has a recess formed in said inner peripheral surface, and
said recess has a shape recessed relative to an upper side and a lower side of said recess.

9. The hydraulic excavator according to claim 5, further comprising a bracket supporting said first exhaust gas treatment device and said second exhaust gas treatment device, wherein
an edge portion of said bracket along the rear end of said second exhaust gas treatment device protrudes toward said counterweight relative to an edge portion of said bracket along the rear end of said first exhaust gas treatment device in a plan view.

10. A method of detaching an exhaust gas treatment device for detaching said exhaust gas treatment device from a hydraulic excavator including a revolving frame, an engine arranged on said revolving frame, an exhaust gas treatment device for treating an exhaust gas from said engine, a counterweight arranged on said revolving frame in a rear of said engine, and an auxiliary plate attachable to and detachable from said counterweight, which is superimposed on said exhaust gas treatment device in a plan view while the auxiliary plate is attached to said counterweight, said counterweight having a plurality of lift portions in an upper surface, and one of said lift portions being provided in said auxiliary plate, comprising the steps of:
detaching said auxiliary plate from said counterweight; and
moving said exhaust gas treatment device diagonally upward so as to avoid interference with said counterweight until said counterweight and said exhaust gas treatment device are no longer superimposed on each other in a plan view.

* * * * *